(12) United States Patent
Seok et al.

(10) Patent No.: US 10,350,487 B2
(45) Date of Patent: Jul. 16, 2019

(54) METHOD AND APPARATUS FOR AUTOMATICALLY TARGETING TARGET OBJECTS IN A COMPUTER GAME

(71) Applicant: WEMADE IO CO., LTD., Gyeonggi-do (KR)

(72) Inventors: Hoon Seok, Seoul (KR); Kyu Il Roh, Seoul (KR); Sung Hee Kim, Seoul (KR); Kwang Soo Lee, Seoul (KR); Young Hoon Lee, Seoul (KR)

(73) Assignee: WE MADE IO CO., LTD. (KR)

( * ) Notice: Subject to any disclaimer, the term of this patent is extended or adjusted under 35 U.S.C. 154(b) by 607 days.

(21) Appl. No.: 14/896,986

(22) PCT Filed: Jun. 11, 2014

(86) PCT No.: PCT/KR2014/005109
§ 371 (c)(1),
(2) Date: Dec. 9, 2015

(87) PCT Pub. No.: WO2014/200255
PCT Pub. Date: Dec. 18, 2014

(65) Prior Publication Data
US 2016/0129345 A1 May 12, 2016

(30) Foreign Application Priority Data

Jun. 11, 2013 (KR) .......................... 10-2013-0066758
Jun. 28, 2013 (KR) .......................... 10-2013-0075948

(51) Int. Cl.
*A63F 13/213* (2014.01)
*A63F 13/426* (2014.01)
(Continued)

(52) U.S. Cl.
CPC .......... *A63F 13/213* (2014.09); *A63F 13/426* (2014.09); *A63F 13/537* (2014.09);
(Continued)

(58) Field of Classification Search
CPC .......................... A63F 13/426; A63F 13/537
See application file for complete search history.

(56) References Cited

U.S. PATENT DOCUMENTS 6,210,273 B1 * 4/2001 Matsuno ................. A63F 13/10
463/31
6,283,861 B1 * 9/2001 Kawai ..................... A63F 13/10
463/32
(Continued)

FOREIGN PATENT DOCUMENTS

JP 2003079952 3/2003
JP 2006122123 5/2006
(Continued)

OTHER PUBLICATIONS

"LOTRO Riders of Rohan Beta: Warden Mounted Combat" by Warsteeds, Youtube, dated Sep. 29, 2012, https://www.youtube.com/watch?v=zurlAsoQIVw.*
(Continued)

*Primary Examiner* — James S. McClellan
*Assistant Examiner* — Kevin M Carter
(74) *Attorney, Agent, or Firm* — Perman & Green, LLP

(57) ABSTRACT

A method of automatically targeting a target object, the method including setting a target range including a designated distance from a user-controlled character and a designated horizontal angle centering at a location of the character, selecting at least one target object included in the set target range, and displaying a shape distinguishable from a shape of the target object at a location near the at least one selected target object, wherein the target object is an object the character is able to attack from among objects in a computer game.

6 Claims, 10 Drawing Sheets

(51) Int. Cl.
*A63F 13/537* (2014.01)
*A63F 13/822* (2014.01)
*A63F 13/5372* (2014.01)
*A63F 13/837* (2014.01)

(52) U.S. Cl.
CPC ........ *A63F 13/5372* (2014.09); *A63F 13/822* (2014.09); *A63F 13/837* (2014.09)

(56) References Cited

U.S. PATENT DOCUMENTS

| | | | | |
|---|---|---|---|---|
| 6,409,604 | B1* | 6/2002 | Matsuno | A63F 13/10 463/31 |
| 6,664,946 | B1* | 12/2003 | Stipes | G06F 3/0346 345/157 |
| 8,210,943 | B1 | 7/2012 | Woodard et al. | |
| 2006/0258445 | A1* | 11/2006 | Nishimori | A63F 13/10 463/30 |
| 2007/0066392 | A1* | 3/2007 | Itou | A63F 13/10 463/31 |
| 2010/0069152 | A1* | 3/2010 | Nishimura | A63F 13/10 463/31 |
| 2010/0255894 | A1* | 10/2010 | Kidakarn | A63F 13/10 463/2 |
| 2010/0267436 | A1 | 10/2010 | Lee | |
| 2010/0323783 | A1* | 12/2010 | Nonaka | A63F 13/67 463/23 |
| 2012/0169716 | A1* | 7/2012 | Mihara | G06T 19/20 345/419 |
| 2012/0229516 | A1* | 9/2012 | Matsunaga | A63F 13/26 345/659 |
| 2012/0306869 | A1 | 12/2012 | Ozaki | |
| 2012/0322523 | A1* | 12/2012 | Woodard | A63F 13/10 463/2 |
| 2015/0031421 | A1* | 1/2015 | Jo | A63F 13/35 463/2 |

FOREIGN PATENT DOCUMENTS

| | | |
|---|---|---|
| JP | 2008307387 | 12/2008 |
| JP | 2012249930 | 12/2012 |
| KR | 20090003491 | 1/2009 |

OTHER PUBLICATIONS

"Riders of Rohan: UI changes and new options" by Department of Strategy, dated Oct. 15, 2012, https://departmentofstrategery.wordpress.com/2012/10/15/riders-of-rohan-ui-changes-and-new-options/.*
"Riders of Rohan Beta: Mounted Combat Demo" by Warsteeds, Youtube, dated Sep. 15, 2012, https://www.youtube.com/watch?v=7yQ-KHxsl5k.*
"The Road to Mordor: Hands-on with Riders of Rohan's mounted combat" by Justin Olivelti, dated Jul. 12, 2012, https://www.engadget.com/2012/07/12/the-road-to-mordor-hands-on-with-riders-of-rohans-mounted-comb/.*
International Search Report, International Application No. PCT/KR2014/005109, dated Sep. 29, 2014.
"Freeze! Water-gun Fight—Bubble Fighter Preview" (Naver Blog); http://blog.naver.com/take1231/90033537213, Jul. 28, 2008, p. 2.
"Battlefield 3—Beginner's Guide" (Naver Blog); http://blog.naver.com/PostPrint.nhn?blogId=ly99&logNo=10141518537, Jun. 23, 2012, pp. 88-80 and 998-108.
"Dream World" Martial Arts, C&C Media Co., Ltd. pp. 160-161; Jan. 10, 2008.
European Search Report, European Application No. 14811255.0, dated Dec. 23, 2016.

* cited by examiner

[Fig. 1]
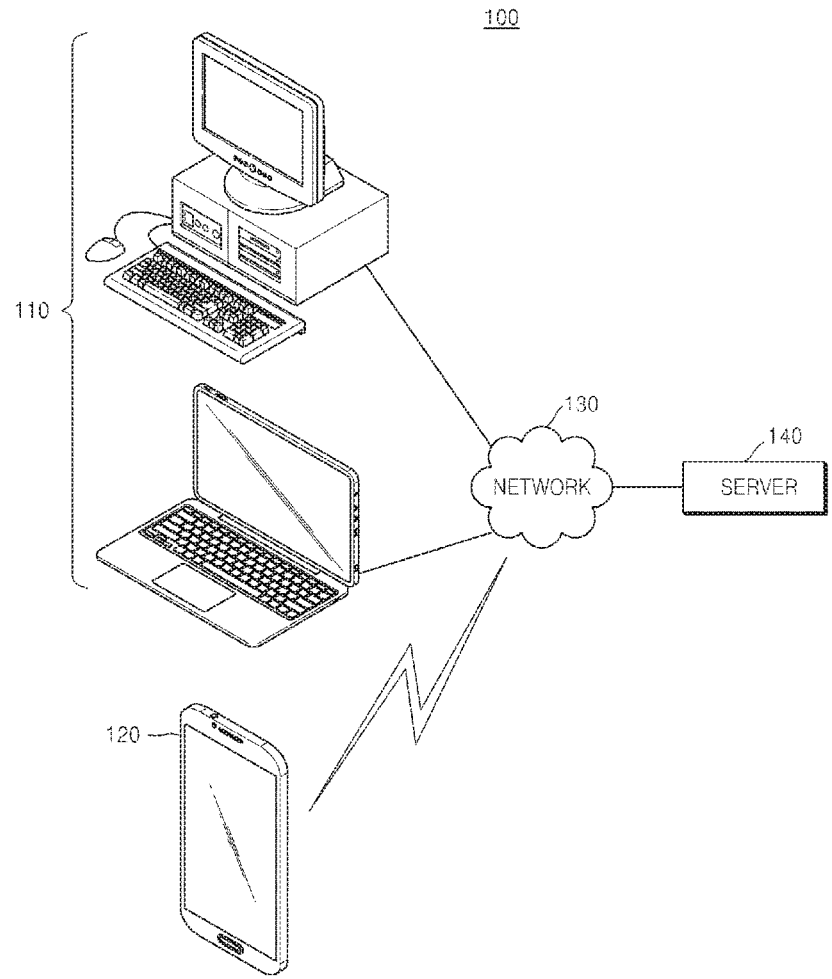
[Fig. 2]
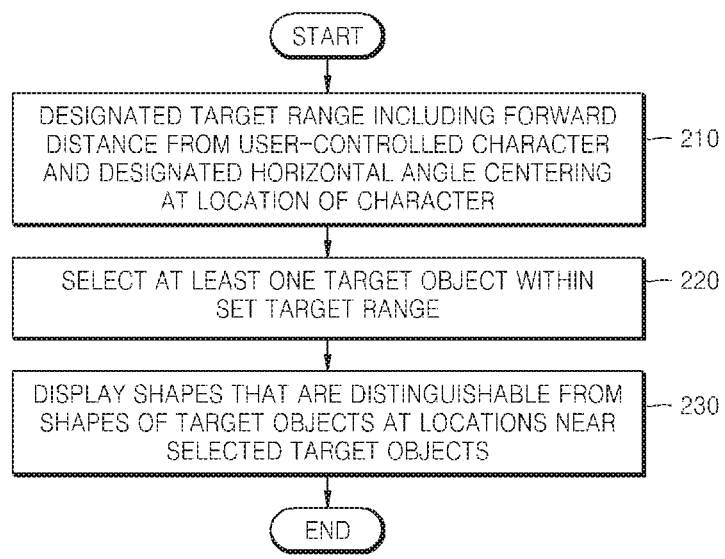

[Fig. 3]
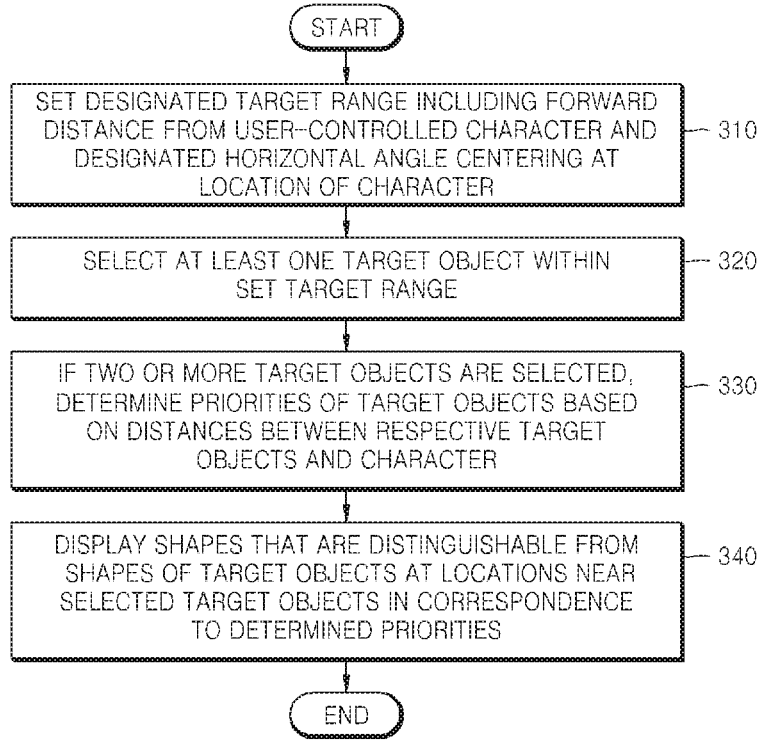
[Fig. 4]
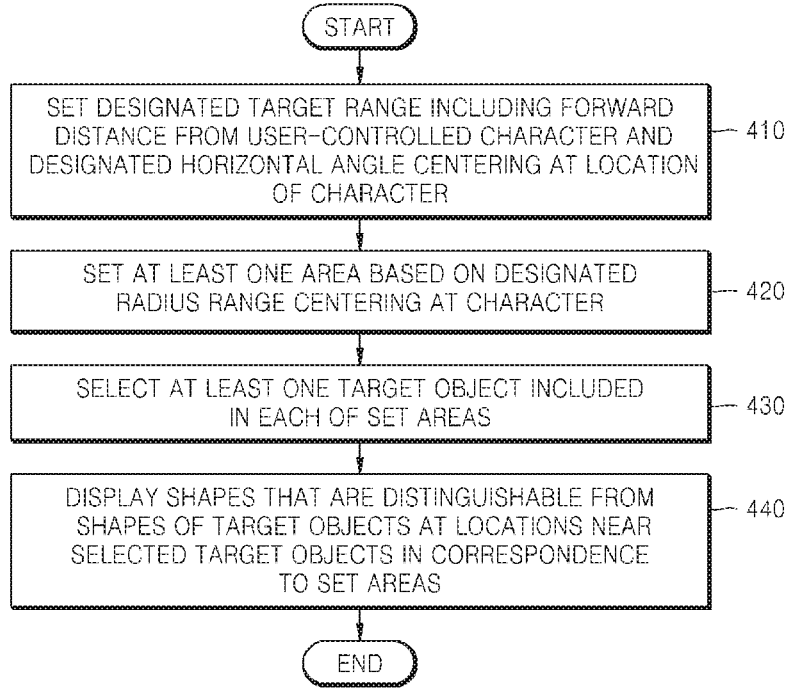

[Fig. 5A]
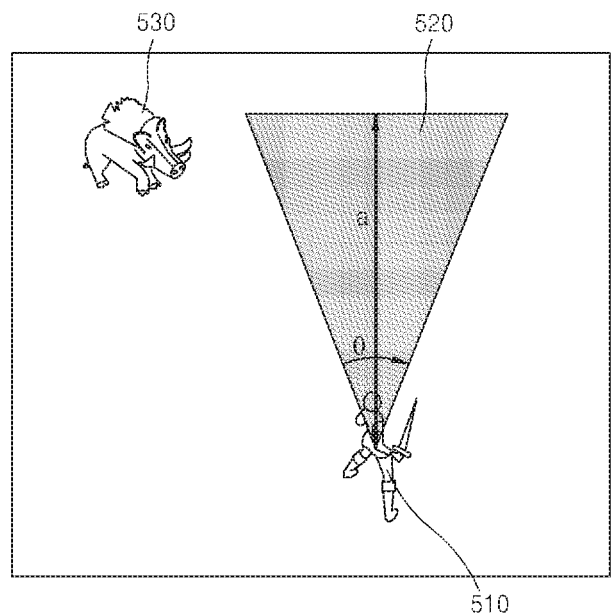
[Fig. 5B]
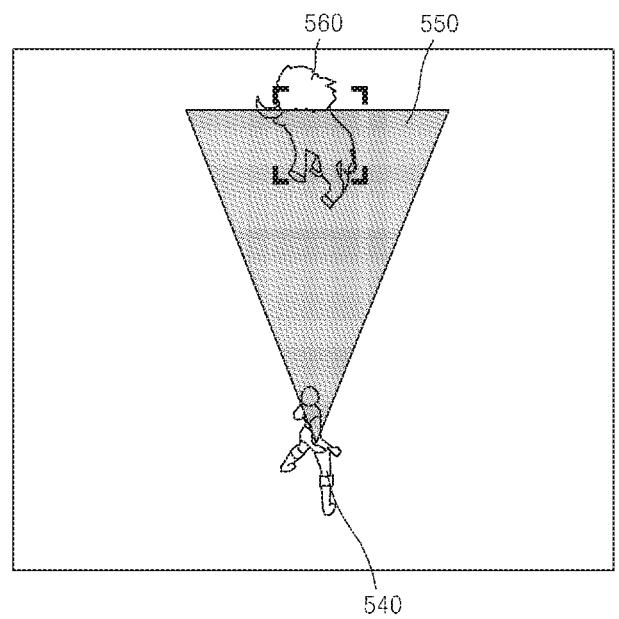

[Fig. 6]
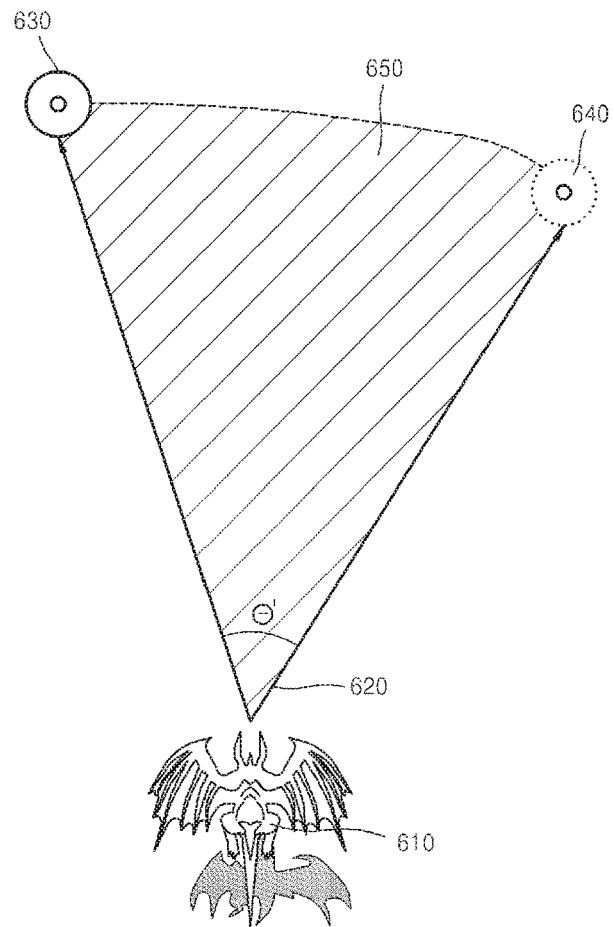
[Fig. 7A]
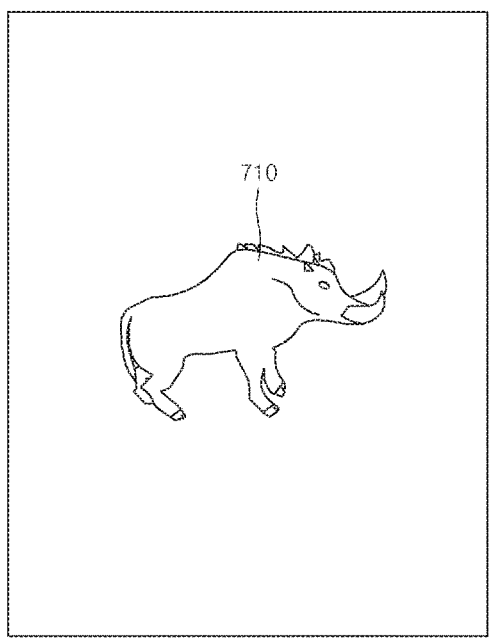

[Fig. 7B]
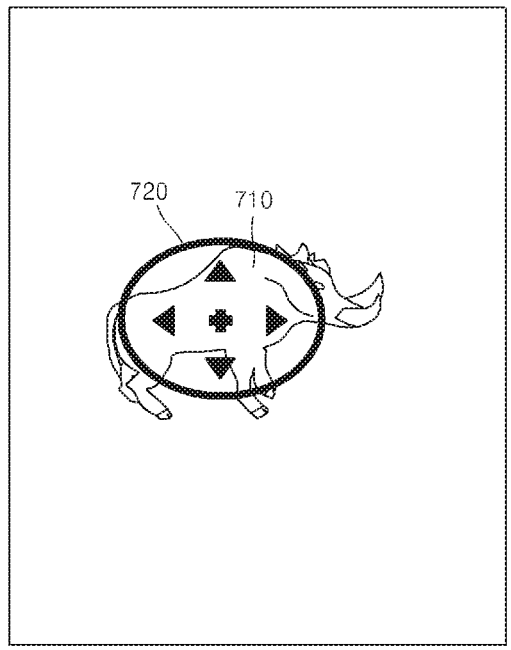
[Fig. 8]
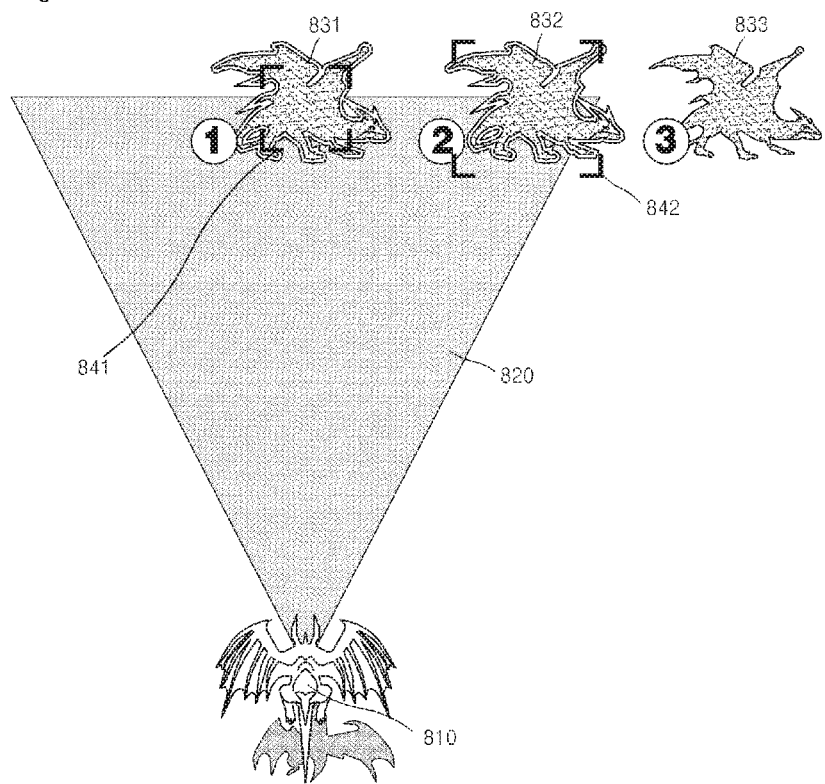

[Fig. 9]
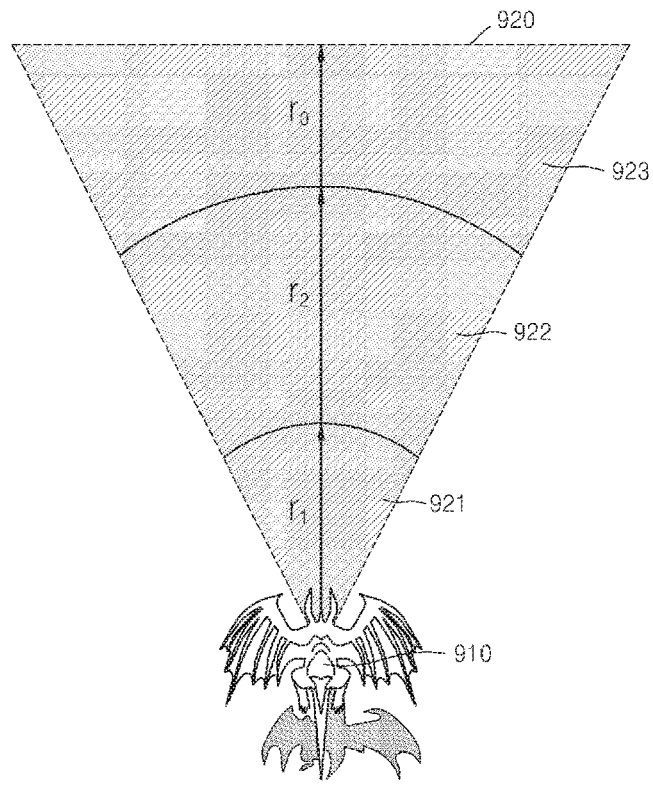
[Fig. 10A]
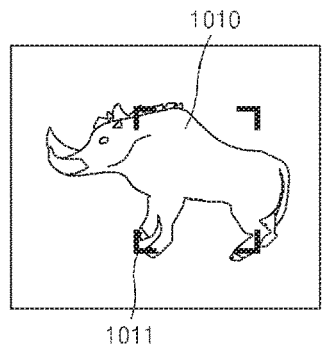
[Fig. 10B]
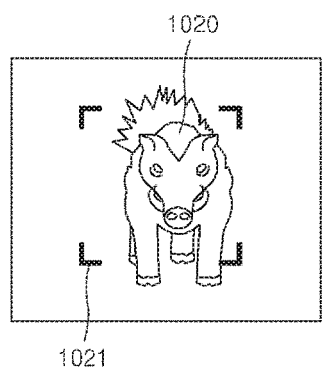

[Fig. 10C]
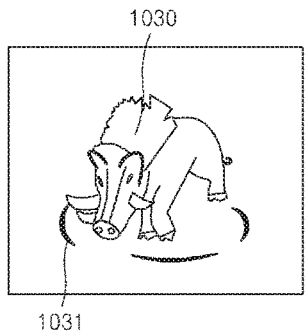
[Fig. 11]
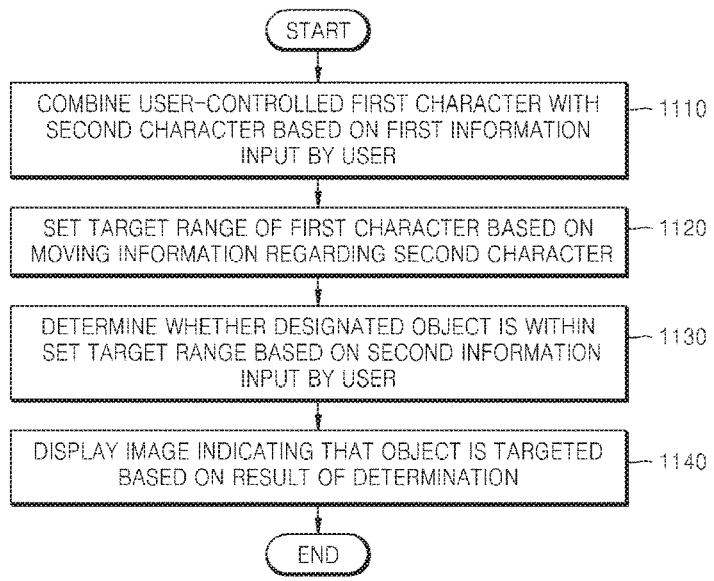
[Fig. 12]
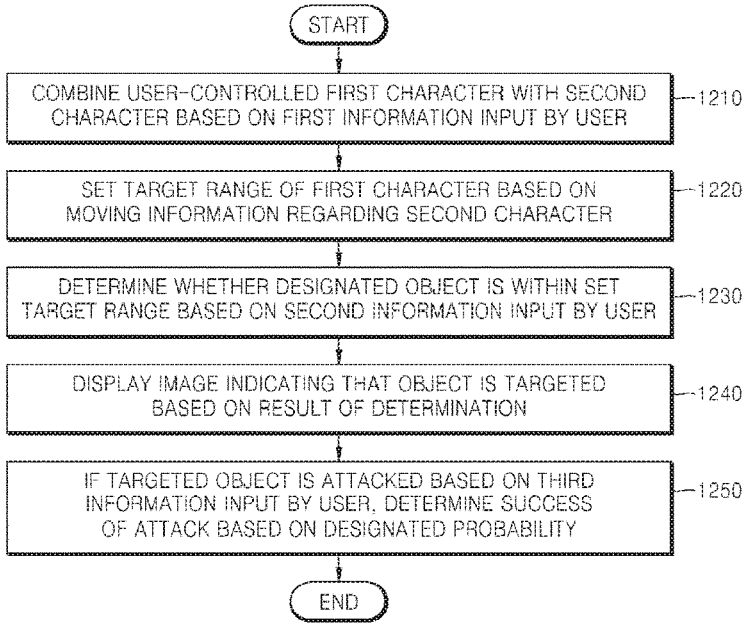

[Fig. 13]
[Fig. 14A]
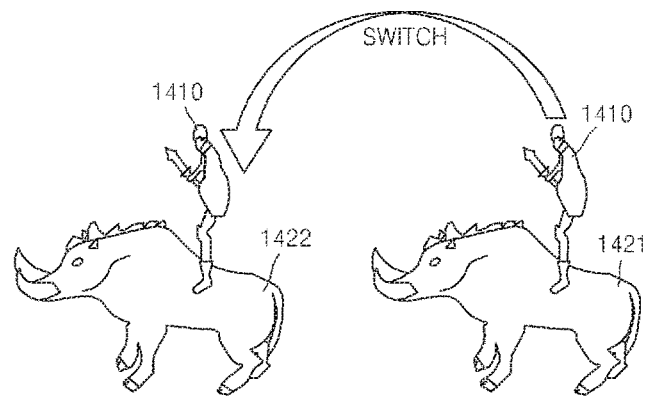

[Fig. 14B]
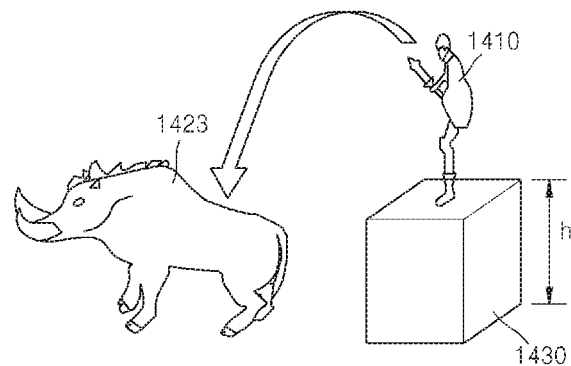
[Fig. 14C]
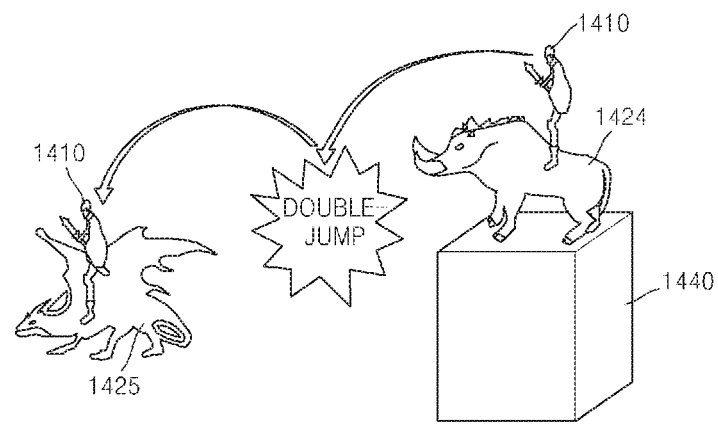
[Fig. 15]
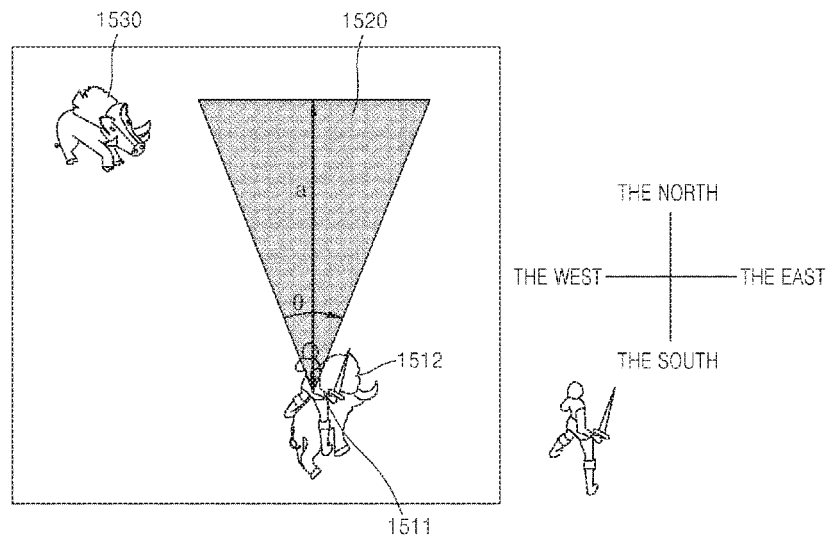

[Fig. 16]
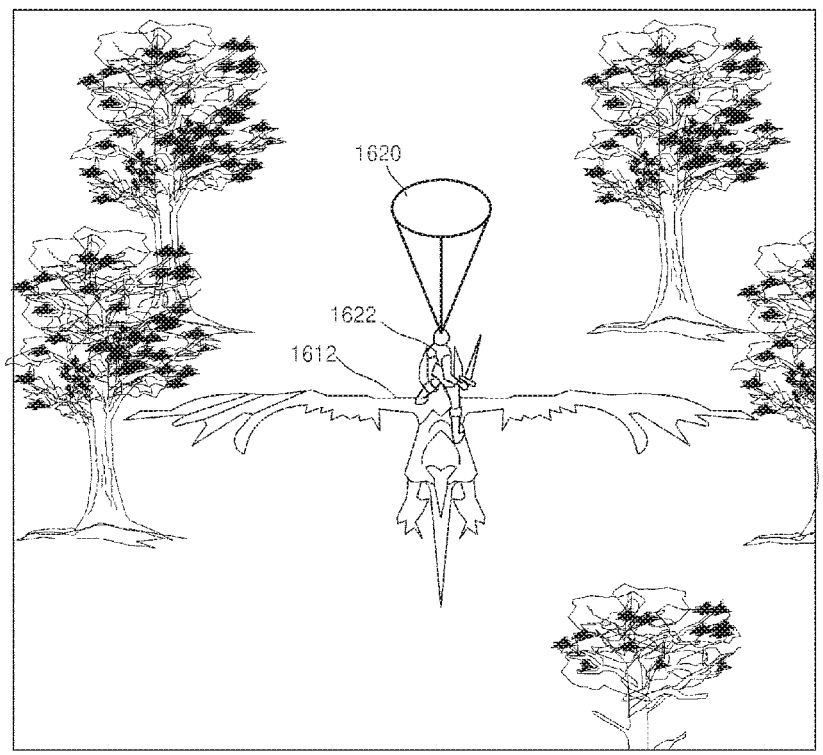

METHOD AND APPARATUS FOR AUTOMATICALLY TARGETING TARGET OBJECTS IN A COMPUTER GAME

CROSS-REFERENCE TO RELATED APPLICATIONS

This application is the National Stage of International Application No. PCT/KR2014/005109 having an International Filing Date of 11 Jun. 2014, which designated the United States of America, and which International Application was published under PCT Article 21 (s) as WO Publication 2014/200255 A1, and which claims priority from and the benefit of Korean Application No. 10-2013-0075940, filed on 28 Jun. 2013 and Korean Application No. 10-2013-0066758, filed on 11 Jun. 2013, the disclosures of which are incorporated herein by reference in their entireties.

BACKGROUND

1. Field

One or more aspects of the presently disclosed embodiment relate to a method and an apparatus for automatically targeting target objects in a computer game.

2. Brief Description of Related Developments

A computer role-playing game (RPG) is a game where users of a plurality of terminals connected via the Internet play as virtual characters that carry out designated missions and roles. In such a conventional RPG, a game server and a user terminal are connected via the Internet and the conventional RPG is played according to control instructions provided by the game server.

A user of a common RPG generates a virtual character and carries out virtual roles in a virtual space provided by the common RPG. In other words, a virtual character generated by a user represents the user in a virtual space. Additionally, a game server provides virtual capital, such as items or game money, to a user, or upgrades a role level (that is, a character of a user), based on role performances of the user, so that the user may enjoy the RPG.

Furthermore, RPG games provide not only characters of users, but also so-called non-playing characters (NPC), which are characters controlled by a game server, thereby maximizing virtual reality impression and fun for users. For example, NPCs are characters that are completely controlled by a pre-set algorithm in a game and may include monsters that are hostile to characters of users or merchant characters selling equipment items or consumable items to characters of users.

However, in the related art, when a character of a user battles a target object in a computer game, the target object is targeted solely based on signals input by a user. In detail, when a user targets a target object by using a mouse, a keyboard, or a touch screen included in a terminal, a character of the user battles the targeted target object. Therefore, since a user has to target each target object with whom to fight in a computer game, the computer game becomes less fun and user concentration decrease.

SUMMARY

One or more aspects of the presently disclosed embodiment include a method of automatically targeting a target object in a computer game by using a designated distance from a location of a user-controlled character and a horizontal angle around the location of the character.

According to the one or more of the above aspects of the presently disclosed embodiment, in a computer game for targeting a target object and attacking the targeted target object, target objects included in a designated range are automatically targeted, and thus a user does not have to operate a terminal to target a target object. As a result, user convenience and concentration on a computer game may be improved.

Furthermore, since a target object appearing at a long range is automatically recognized and targeted, a user may play a computer game more easily. Furthermore, a user may play the computer game such that a target is not untargeted after the target object is targeted, and thus playing a computer game may be more fun.

BRIEF DESCRIPTION OF THE DRAWINGS

These and/or other aspects will become apparent and more readily appreciated from the following description of the aspects, taken in conjunction with the accompanying drawings in which:

FIG. 1 is a diagram of a system for playing a computer game, according to an aspect of the presently disclosed embodiment;

FIG. 2 is a flowchart of a method of targeting a target object, according to an aspect of the presently disclosed embodiment;

FIG. 3 is a flowchart of a method of targeting a target object, according to another aspect of the presently disclosed embodiment;

FIG. 4 is a flowchart of a method of targeting a target object, according to another aspect of the presently disclosed embodiment;

FIGS. 5A and 5B are diagrams showing target ranges according to an aspect of the presently disclosed embodiment;

FIG. 6 is a diagram showing that the horizontal angle θ is changed based on information input by a user;

FIGS. 7A and 7B are diagrams showing shapes that are distinguishable from shapes of target objects, according to an aspect of the presently disclosed embodiment;

FIG. 8 is a diagram showing an operation of the terminal (in detail, the display unit of the terminal), according to an aspect of the presently disclosed embodiment;

FIG. 9 is a diagram showing an example that the terminal according to an aspect of the presently disclosed embodiment divides a target range into at least one area;

FIGS. 10A-10C are diagrams showing the terminal displays different shapes corresponding to the divided areas at locations near the selected target objects, respectively;

FIG. 11 is a flowchart of a method of targeting an object, according to an aspect of the presently disclosed embodiment;

FIG. 12 is a flowchart of a method of targeting an object, according to an aspect of the presently disclosed embodiment;

FIG. 13 is a diagram showing an operation for selecting a second character, according to an aspect of the presently disclosed embodiment;

FIGS. 14A-14C are diagrams showing that a character and an object are combined with each other, according to an aspect of the presently disclosed embodiment;

FIG. 15 is a diagram showing an example of setting a target range in a case where a second character according to an aspect of the presently disclosed embodiment is a character moving on the ground; and FIG. 16 is a diagram showing an example of setting a target range in a case where a second character according to an aspect of the presently disclosed embodiment is a character moving in the sky.

One or more aspects of the presently disclosed embodiment include a method of automatically targeting a target object in a computer game by using a designated distance from a location of a user-controlled character and a horizontal angle around the location of the character.

Additional aspects will be set forth in part in the description which follows and, in part, will be apparent from the description, or may be learned by practice of the presented aspects.

DETAILED DESCRIPTION

According to one or more aspects of the presently disclosed embodiment, a method of targeting a target object, the method includes setting a targeting range including a designated distance from a user-controllable character and a designated horizontal angle centering at location of the character; selecting at least one target object included in the set targeting range; and displaying a shape distinguishable from shape of the target object at a location nearby the selected target object, wherein the target object refers to an object the character is able to attack from among objects in a computer game.

According to one or more aspects of the presently disclosed embodiment, a method of targeting at least one object in a computer game, the method includes combining a first user-controlled character with a second character based on first input information from a user; setting a targeting range of the first character based on moving information regarding the second character; determining whether the object is within the set targeting range based on second input information from the user; and displaying an image indicating that an object is targeted based on a result of the determination.

According to one or more aspects of the presently disclosed embodiment, an apparatus for executing a computer game, the apparatus includes a setting unit, which sets a targeting range including a designated distance from a user-controllable character and a designated horizontal angle centering at location of the character; selecting unit, which selects at least one target object included in the set targeting range; and a display unit, which displays a shape distinguishable from shape of the target object at a location nearby the selected target object.

According to one or more aspects of the presently disclosed embodiment, an apparatus for executing a computer game, the apparatus includes a combining unit, which combines a first user-controlled character with a second character based on first input information from a user; a setting unit, which sets a targeting range of the first character based on moving information regarding the second character; a determining unit, which determines whether the object is within the set targeting range based on second input information from the user; and a display unit, which displays an image indicating that an object is targeted based on a result of the determination.

Reference will now be made in detail to aspects, examples of which are illustrated in the accompanying drawings, wherein like reference numerals refer to like elements throughout. In this regard, the presently disclosed embodiment may have different forms and should not be construed as being limited to the descriptions set forth herein. Accordingly, the aspects are merely described below, by referring to the figures, to explain aspects of the present description. As used herein, the term "and/or" includes any and all combinations of one or more of the associated listed items.

As the disclosed embodiment allows for various changes and numerous aspects, particular aspects will be illustrated in the drawings and described in detail in the written description. However, this is not intended to limit the presently disclosed embodiment to particular modes of practice, and it is to be appreciated that all changes, equivalents, and substitutes that do not depart from the spirit and technical scope of the presently disclosed embodiment are encompassed in the presently disclosed embodiment. In the description of the presently disclosed embodiment, certain detailed explanations of related art are omitted when it is deemed that they may unnecessarily obscure the essence of the disclosed embodiment.

In aspects of the presently disclosed embodiment, the terms "communication", "communication network", and "network" may be synonyms. These terms refer to a narrow area communication network or a broad area comment network capable of transmitting and receiving files between a user terminal and a server via wires or wirelessly.

Hereinafter, the term "server" refers to a server computer that users access to use game content. In small games or games with a small number of users, a plurality of game programs may be operated at a single game server. On the other hand, in a very large game or a game with a large number of users simultaneously accessing the game, there may be more than one server for operating a single game. Furthermore, middleware regarding databases or servers for processing payments may be connected to a game server. However, descriptions thereof will be omitted below.

Hereinafter, the term "computer game" refers to game content that users may use by accessing the game server. Particularly, the term "computer game" refers to a computer game, in which a plurality of users may simultaneously play and upgrade levels of characters by training characters or obtaining experience points. Furthermore, the term "computer game" refers to a computer game, in which users may purchase various types of items for smooth gameplay.

Furthermore, various group communities may be used in a computer game. For example, guilds or clans in a computer game may be formed. The terms "guild" or "clan" refers to groups or organizations organized by users playing particular computer games. The reputation of each organization may be improved based on the number of users therein or levels of characters of the users therein, and various benefits in the computer game may be given based on the reputation. For example, if the reputation of a guild or a clan improves, characters thereof may be displayed differently (e.g., names of characters thereof may be changed) or benefits regarding items or facilities in the computer game may be given to characters thereof.

Furthermore, group communities available in a computer game also include party play. The term "party" is an in-game group formed as users invite one another and accept invitations, where members of a formed party may use a dedicated chatting system or a particular marking for identifying party members in a game screen image.

Furthermore, members of a party may distribute items to one another or share result content obtained as a result of playing the game. It may be set to equally distribute result content to each of members or to distribute at least portions of result content to other members.

Hereinafter, the term 'result content' refers to all content that may be obtained by characters of users as a result of playing a game. For example, in a shooting game, experience and cyber money that can be obtained when a single game is over may be included in result content. In a sports game, experience and cyber money that can be obtained when a single game is over may be included in result content. In case of an RPG game, experience and compensation cyber money that can be obtained when a particular quest is completed or a monster is killed may be result content.

FIG. 1 is a diagram of a system 100 for playing a computer game according to an aspect of the presently disclosed embodiment.

FIG. 1 shows examples of terminals including a desktop or laptop PC 110 and a mobile or smartphone 120, where the terminals are connected to a server 140 via a network 130 and perform tasks.

Here, the network 130 may include the Internet, a local area network (LAN), a wireless LAN, a wide area network (WAN), and a personal area network (PAN). However, the presently disclosed embodiment is not limited thereto, and the network 130 may include other types of networks via which data may be transmitted and received. In aspects described below, it will be assumed that data transmission and reception between the terminal and the server 140 are performed via the network 130. However, the presently disclosed embodiment is not limited thereto.

Furthermore, a smartphone, including a touch screen, will be provided as an example of the mobile or smartphone 120. However, any other device capable of accessing the server 140 via the network 130 and performing tasks may be applied.

Here, a touch screen refers to a display screen to which designated information may be input via 'gestures' of a user. For example, gestures stated below may include a tap, a touch & hold, a double-tap, a drag, a pan, a flick, a drag-and-drop, etc.

Hereinafter, although it is assumed in the description below that a terminal for performing a method of targeting a target object, according to an embodiment of the presently disclosed embodiment, is the desktop or laptop PC 110, one of ordinary skill in the art will understand that the method may also be performed by the mobile or smartphone 120. Hereinafter, the desktop or laptop PC 110 is referred to as the terminal 110.

Furthermore, although it is assumed that data for performing a method of obtaining a sub-character described below with reference to FIG. 2 through 16 is mainly processed by the terminal 110, one of ordinary skill in the art will easily understand that the terminal 110 may perform a user interface (UI) function and a display function and data may be processed by the server 140.

For example, the terminal 110 may receive information required for proceeding a game from a user and may transmit the information to the server 140 via the network 130. Next, the server 140 may process data as described below by using the transmitted information and may transmit a result of processing the data to the terminal 110 via the network 130. Next, the terminal 110 may display the transmitted result of processing the data on a display screen of the terminal 110.

In addition, one of ordinary skill in the art will easily understand that the terminal 110 and the server 140 may appropriately share data processing for proceeding a computer game. In other words, the terminal 110 and the server 140 connected to each other via the network 130 may organically process data like one processor or a plurality of processors that are connected to one another.

For example, the terminal 110 may include a setting unit for setting a target range including a designated distance from a user-controlled character and a horizontal angle around a location of the character, a selecting unit for selecting at least one target object included in a set target range, and a display unit for displaying a shape distinguished from a shape of the target object at a location adjacent to the selected target object.

As another example, the terminal 110 may include a combining unit, the setting unit, a determining unit, and the display unit. In detail, the combining unit of the terminal 110 combines a first character controlled by a user with a second character based on first information input by the user. Furthermore, the setting unit of the terminal 110 determines a target range of the first character based on moving information of the second character. Furthermore, the determining unit of the terminal 110 determines whether a designated object is in a set target range based on second input information from the user. Furthermore, the display unit of the terminal 110 displays an image indicating that the object is targeted based on a result of the determination.

Here, each of the selecting unit, the combining unit, the setting unit, the determining unit, and the display unit included in the terminal 110 may be embodied by one processor or a plurality of processors. A processor may be embodied as an array of a plurality of logic gates or a combination of a general purpose microprocessor and a memory storing a program to be executed by the microprocessor. Furthermore, one of ordinary skill in the art will understand that the selecting unit, the determining unit, and/or the converting unit may be embodied in any of various other types of hardware.

Hereinafter, referring to FIGS. 2 through 10, a method of targeting a target object according to an aspect of the presently disclosed embodiment will be described in detail. The setting unit, the selecting unit, and the display unit as described above may perform operations of a method targeting an object.

Hereinafter, an example of a method of targeting an object will be described with reference to FIGS. 7A, through 8 and FIGS. 11 through 16. The combining unit, the setting unit, the determining unit, and the display unit as described above may perform operations of a method of targeting an object.

FIG. 2 is a flowchart of a method of targeting a target object, according to an aspect of the presently disclosed embodiment.

Referring to FIG. 2, the method of targeting a target object includes operations that are chronologically performed by the terminal or the server 140 shown in FIG. 1. Therefore, even though omitted below, descriptions above of the terminal or the server 140 shown in FIG. 1 may also be applied to the method of obtaining a sub-character as shown in FIG. 2.

In operation 210, the terminal (110 of FIG. 1) sets a target range including a designated distance from a user-controlled character and a designated horizontal angle around a location of the character. In detail, the setting unit of the terminal (110 of FIG. 1) sets a target range including a designated distance from a user-controlled character and a designated horizontal angle around a location of the character.

Here, the target object is an object that can be attacked by a character from among objects in a computer game. For example, a target object may be a monster in a computer game or another character controlled by another user. However, the presently disclosed embodiment is not limited thereto, and the target object may include any target that can be attacked by a character.

Hereinafter, a target range according to an aspect of the presently disclosed embodiment will be described.

FIGS. 5A and 5B are diagrams showing target ranges according to an aspect of the presently disclosed embodiment.

FIG. 5A shows an example of a designated distance from a character and a designated horizontal angle around a location of the character, which constitute a target range. Furthermore, FIG. 5B shows an example of a target object included in a target range.

Referring to FIG. 5A, a user-controlled character 510 (hereinafter, referred to as the character 510) and a target object 530 are shown. Here, the target object 530 is an object that can be attacked by the character 510 from among objects in a computer game and may be a monster, for example.

The terminal (110 of FIG. 1) sets a target range including a designated distance a from the character 510 and a designated horizontal angle θ around a location of the character 510.

The designated distance a from the character 510 is a distance in a direction that is parallel to a direction that the character 510 faces from a location of the character 510 in a computer game. For example, the designated distance a may be 20 m. However, the presently disclosed embodiment is not limited thereto. Furthermore, designated horizontal angle θ around the location of the character 510 is a central angle in a horizontal direction. For example, the designated horizontal angle θ may be 180°. However, the presently disclosed embodiment is not limited thereto.

When the designated distance a and the designated horizontal angle θ are determined, a target range 520, including the determined designated distance a and the determined designated horizontal angle θ, may be set. Therefore, the terminal (110 of FIG. 1) may set the target range 520 by setting the designated distance a and the designated horizontal angle θ.

Referring to FIG. 5A, the target range 520 is displayed distinguishably from the surroundings. However, the presently disclosed embodiment is not limited thereto. In other words, the target range 520 may not be displayed on the display screen of the terminal (110 of FIG. 1).

In addition, the target range 520 may be determined based on a type of an equipment item set to the character 510. Here, the target range 520 is a range in which the effect of an equipment item is applied, whereas the target object 530 is a target object included in a range in which the effect of an equipment item is applied.

For example, comparing a case in which an equipment item set to the character 510 is a 'bow' to a case in which an equipment item set to the character 510 is a 'sword', a longer range attack may be performed in the case in which the character 510 is equipped with the 'bow' than in the case in which the character 510 is equipped with the 'sword'. In other words, when the character 510 is equipped with a 'bow', even the target object 530 that is far away from the character 510 can be attacked. Therefore, the target range 520 of the case in which the character 510 is equipped with a 'bow' may be larger than the target range 520 of the case in which the character 510 is equipped with a 'sword'.

Here, the designated distances a and the designated horizontal angles θ constituting the target range 520 may be pre-set with respect to types of equipment items. For example, if an equipment item is a 'bow', the designated distance may be set to 30 m and the horizontal angle may be set to 180° in advance. On the other hand, if an equipment item is a 'sword', the designated distance may be set to 3 m and the horizontal angle may be set to 90° in advance. Therefore, every time a user changes an equipment item set to the character 510, the target range 520 may be changed based on a pre-set designated distance a and a pre-set horizontal angle θ.

In addition, the horizontal angle θ may also refer to an angle formed by a location of the character 510 and two different locations selected based on information input by a user. In other words, as described above, the designated horizontal angle θ may be changed based on an equipment item set to the character 510 or based on information input by a user.

Here, an example that the horizontal angle θ is changed based on information input by a user will be described below with reference to FIG. 6.

FIG. 6 is a diagram of an example that the horizontal angle θ is changed based on information input by a user.

Referring to FIG. 6, two different locations 630 and 640 that are selected based on information input by a user and a target range 650 are displayed. Here, the information input by a user is information input via a UI unit included in the terminal (110 of FIG. 1). Therefore, the information input by a user is information regarding the two different locations 630 and 540 input is the UI unit.

Here, a UI unit is a module which obtains information input by a user and displays output information to the user. For example, a UI unit my include both input and output devices, such as a display panel, a mouse, a keyboard, a touch screen, a monitor, and a speaker, and software modules for driving the same.

When a user selects the two different locations 630 and 640 is the UI unit, the terminal (110 of FIG. 1) (in detail, the setting unit of the terminal (110 of FIG. 1)) sets an angle θ' formed by a location 620 of a character 610 and the two differently selected locations 630 and 640 as a horizontal angle. Next, the terminal (110 of FIG. 1) may select an area formed by the location 620 of the character 610 and the two differently selected locations 630 and 640 as the target range 650.

Here, the set horizontal angle θ may be included in a range of horizontal angles θ that are pre-set based on types of equipment items set to the character 610. For example, if the character 610 is equipped with a 'bow' and a horizontal angle θ that is pre-set to the 'bow' is 180°, a horizontal angle set by the two different locations 630 and 640 selected by a user may be within 180°. Therefore, if the angle θ' formed by the location 620 of the character 610 and the two different locations 630 and 640 exceeds 180°, the terminal (110 of FIG. 1) limits the angle θ' to be within 180°.

Furthermore, the target range 650, which is an area formed by the location 620 of the character 610 and the two different locations 630 and 640, may be included in a target range that is pre-set based on a type of an equipment item set to the character 610. For example, if it is assumed that an equipment item set to the character 610 is a 'bow', the target range 650 set based on the two different locations 630 and 640 selected by a user must be included in a target range formed by a designated distance and a target range that are pre-set to the 'bow'. Therefore, if the target range 650 formed by the location 620 of the character 610 and the two different locations 630 and 640 exceeds a pre-set target range, the terminal (110 of FIG. 1) limits the target range 650 to be within the pre-set target range.

Referring to FIG. 5B, a target object 560 included in a set target range 550 is shown. If the target object 560 moves into the target range 550 of a character 540, the terminal (110 of FIG. 1) automatically sets the target object 560 as a target to be attacked by the character 540.

Referring back to FIG. 2, in operation 220, the terminal (110 of FIG. 1) selects at least one target object included in a set target range. In detail, the selecting unit of the terminal (110 of FIG. 1) selects at least one target object included in a set target range.

Objects shown in a computer game may include objects that a character of a user can attack and objects that a character of a user cannot attack. Here, the objects that a character of a user can attack (that is, target objects) may include monsters and enemy characters controlled by other users, whereas the objects that a character of a user cannot attack may include animals, plants, or terrain features in the background.

The terminal (110 of FIG. 1) selects objects that a character of a user can attack (that is, target objects) from among objects included in a set target range, where the number of selected target objects is not limited.

In operation 230, the terminal (110 of FIG. 1) displays a shape distinguishable from shapes of target objects at a location on the display screen of the terminal (110 of FIG. 1) that is near the selected target objects. In detail, the display unit of the terminal (110 of FIG. 1) displays a shape distinguishable from shapes of target objects at a location on the display screen of the terminal (110 of FIG. 1) that is near the selected target objects.

Here, the shape distinguishable from shapes of target objects may be any shape as long as the shape indicates that target objects are included in a target range. Hereinafter, an example of shapes that are distinguishable from shapes of target objects will be described with reference to FIGS. 7A and 7B.

FIGS. 7A and 7B are diagrams showing shapes that are distinguishable from shapes of target objects, according to an aspect of the presently disclosed embodiment.

FIG. 7A is a screen image displayed on the display screen of the terminal (110 of FIG. 1) when a target object 710 is not in a target range, whereas FIG. 7B is a screen image displayed on the display screen of the terminal (110 of FIG. 1) when the target object 710 is in a target range.

Referring to FIG. 7A, if the target object 710 is not in a target range, no additional shape other than shape of the target object 710 is displayed. However, referring to FIG. 7B, if the target object 710 is in a target range as the target object 710 or a character of a user moves, a shape 720 that is distinguishable from the shape of the target object 710 is displayed at a location near the target object 710. Therefore, the user may recognize that the target object 710 is in a target range and may attack the target object 710 by using an equipment item set to a character.

In addition, the terminal (110 of FIG. 1) (in detail, the display unit of the terminal (110 of FIG. 1)) continuously displays the shape 720 that is distinguishable from shapes of the target objects 710 for a time that the selected target objects 710 are included in a target range. Detailed descriptions thereof will be given below with reference to FIG. 8.

FIG. 8 is a diagram showing an operation of the terminal (110 of FIG. 1) (in detail, the display unit of the terminal (110 of FIG. 1)), according to an aspect of the presently disclosed embodiment.

Referring to FIG. 8, a character 810 and target objects 831, 832, and 833 passing through a target range 820 are shown. Here, the target objects 831, 832, and 833 are not three different target objects. Instead, the target objects 831, 832, and 833 are a single target object 831, 832, and 833 that passes through the target range 820 according to lapse of time.

The terminal (110 of FIG. 1) continuously displays shapes 841 and 842 that are distinguishable from shapes of the target objects 831 and 832 during a time that the selected target objects 831 and 832 are in the target range 820. In detail, in FIG. 8, the reference numerals 831 and 832 indicate a case in which a target object is in the target range 820, whereas the reference numeral 833 indicates that the target object moved out of the target range 820. The terminal (110 of FIG. 1) (in detail, the display unit of the terminal (110 of FIG. 1)) continuously displays the shapes 841 and 842 that are distinguishable from shapes of the target objects 831 and 832 during a time that the selected target objects 831 and 832 are in the target range 820, thereby notifying a user that the target objects 831 and 832 can be attacked from a current location of the character 810.

In addition, the shapes 841 and 842 that are distinguishable from shapes of the target objects 831 and 832 may differ based on the locations of the target objects 831 and 832 in the target range 820. In detail, if the target object 831 is located near the center of the target range 820, the target object 831 cannot move out of the target range 820 within a short time. Here, the terminal (110 of FIG. 1) displays the shape 841 that is distinguishable from a shape of the target object 831 to be small, thereby notifying a user that the target object 831 cannot move out of the target range 820 within a short time.

Furthermore, if the target object 832 is located near a boundary of the target range 820, the target object 832 will move out of the target range 820 within a short time. Here, the terminal (110 of FIG. 1) displays the shape 842 that is distinguishable from the shape of the target object 832 to be large, thereby notifying a user that the target object 832 will move out of the target range 820 within a short time.

As described above, since the terminal (110 of FIG. 1) automatically targets target objects included in a designated range, a user does not have to operate the terminal (110 of FIG. 1) to target a target object. As a result, user convenience and concentration on a computer game may be improved. Furthermore, since the terminal (110 of FIG. 1) automatically recognizes and targets a target object appearing at a long range, a user may play a computer game more easily.

FIG. 3 is a flowchart of a method of targeting a target object, according to another aspect of the presently disclosed embodiment.

Referring to FIG. 3, the method of targeting a target object includes operations that are chronologically performed by the terminal or the server 140 shown in FIG. 1. Therefore, even though omitted below, descriptions above of the terminal or the server 140 shown in FIG. 1 and the method described above with reference to FIG. 2 may also be applied to the method of targeting a target object, as shown in FIG. 3.

In addition, operations 310 and 320 shown in FIG. 3 correspond to operations 210 and 220 described above with reference to FIG. 2, respectively. Therefore, detailed descriptions thereof will be omitted.

In operation 330, if two or more target objects are selected, the terminal (110 of FIG. 1) determines priorities of the target objects based on their respective distances between the target objects and a character. Here, the priorities are priorities for a user to attack by using a character. For example, the terminal (110 of FIG. 1) may determine priorities of target objects based on distances from a location of a character.

Furthermore, if there is a target object selected by information input by a user, the terminal (110 of FIG. 1) may determine priorities of target objects by setting the highest priority to the target object selected based on information input by a user.

For example, it is assumed that the total number of target objects included in a target range is 3, a first target object is the closest object to a location of a character, a second target object is the second closest object to the location of the character, and a third target object is the farthest object from the location of the character. Furthermore, it is assumed that a user selected the second character separately via a UI unit. Here, a user may select the second character separately by clicking on a shape corresponding to the second character by using a mouse included in the terminal (110 of FIG. 1). However, the presently disclosed embodiment is not limited thereto.

Here, if priorities of target objects are determined based on their respective distances between target objects and a character, the priorities are determined in the order of 'the first target object→the second target object→the third target object'. However, since the user selected the second target object, the terminal (110 of FIG. 1) determines priorities of the target objects in the order of 'the second target object-→the first target object→the third target object'.

In operation 340, the terminal (110 of FIG. 1) displays different shapes at locations near the selected target objects in correspondence to the priorities determined in operation 330. For example, if priorities of target objects are determined in the order of 'the second target object→the first target object→the third target object', the terminal (110 of FIG. 1) displays a shape, which is larger or brighter than shapes to be displayed at locations near shapes of the first target object and the third target object, at a location near the shape of the second target object. Therefore, a user may recognize which of the target objects included in a target range needs to be attacked first and play a computer game based on the recognition.

FIG. 4 is a flowchart of a method of targeting a target object, according to another aspect of the presently disclosed embodiment.

Referring to FIG. 4, the method of targeting a target object includes operations that are chronologically performed by the terminal or the server 140 shown in FIG. 1. Therefore, even though omitted below, descriptions above of the terminal or the server 140 shown in FIG. 1 and the methods described above with reference to FIGS. 2 and 3 may also be applied to the method of targeting a target object as shown in FIG. 4.

In addition, operation 410 shown in FIG. 4 corresponds to operation 210 described above with reference to FIG. 2. Therefore, detailed descriptions thereof will be omitted.

In operation 420, the terminal (110 of FIG. 1) sets at least one area based on a designated radius range centering at a character. In detail, the terminal (110 of FIG. 1) divides a target range set in operation 410 into at least one area based on a designated radius range. Detailed descriptions thereof will be given below with reference to FIG. 9.

FIG. 9 is a diagram showing an example that the terminal (110 of FIG. 1) according to an aspect of the presently disclosed embodiment divides a target range into at least one area.

Referring to FIG. 9, a user-controlled character 910 (hereinafter, referred to as the character 910) and a target range 920 are shown. Although FIG. 9 shows that the target range 920 is divided into three areas 921, 922, and 923, the presently disclosed embodiment is not limited thereto. In other words, as long as the target range 920 is divided into two or more different areas, the number of divided areas is not limited.

The terminal (110 of FIG. 1) divides the target range 920 into at least one area, for example, the three areas 921, 922, and 923, based on a designated radius range. For example, the terminal (110 of FIG. 1) calculates a radius r0 of the target range 920 based on location of the character 910 and may divide the target range 920 based on a radius r1, which is obtained by dividing the calculated radius r0 by n. Furthermore, the terminal (110 of FIG. 1) may set arbitrary radiuses r1 and r2 and may divide the target range 920 based on the set radiuses r1 and r2.

Referring back to FIG. 4, in operation 430, the terminal (110 of FIG. 1) selects at least one target object included in each set area. In detail, the terminal (110 of FIG. 1) selects target objects included in each of the areas set in operation 420.

Referring back to FIG. 9, the terminal (110 of FIG. 1) selects target objects included in each of the area 921, the area 922, and the area 923 that are formed by dividing the target range 920. In detail, the terminal (110 of FIG. 1) selects a target object included in the area 921, a target object included in the area 922, and a target object included in the area 923.

Referring back to FIG. 4, the terminal (110 of FIG. 1) displays shapes that are distinguishable from shapes of the selected target objects at locations near the selected target objects on the display screen of the terminal (110 of FIG. 1) in correspondence to the set areas. In detail, the terminal (110 of FIG. 1) displays different shapes corresponding to the areas divided in operation 420 at locations near the selected target objects on the display screen of the terminal (110 of FIG. 1), respectively. Detailed descriptions thereof will be given below with reference to FIGS. 10A, 10B and 10C.

FIGS. 10A through 10C are diagrams showing how the terminal (110 of FIG. 1) displays different shapes corresponding to the divided areas at locations near the selected target objects, respectively.

FIGS. 10A, 10B, and 10C show target objects 1010, 1020, and 1030 that are located at different areas (921, 922, and 923 of FIG. 9) formed by dividing the targeting area (920 of FIG. 9), respectively. Although FIG. 10 shows that the total number of different areas (921, 922, and 933 of FIG. 9) formed by dividing the targeting area (920 of FIG. 9) is 3, the presently disclosed embodiment is not limited thereto as described above with reference to FIG. 9. Furthermore, although FIG. 10 shows that target objects 1010, 1020, and 1030 are respectively located in the areas (921, 922, and 933 of FIG. 9), the presently disclosed embodiment is not limited thereto.

The terminal (110 of FIG. 1) displays different shapes 1011, 1021, and 1031 that are distinguishable from shapes of the target objects 1010, 1020, and 1030 at locations near the selected target objects 1010, 1020, and 1030 on the display screen of the terminal (110 of FIG. 1) in correspondence to the areas (921, 922, and 933 of FIG. 9), respectively. Here, the different shapes may be same shapes that have a different brightness, like the shapes denoted by the reference numerals 1011 and 1021. Furthermore, the different shapes may be different shapes that have the same brightness, like the shapes denoted by the reference numerals 1011 and 1031.

As described above, in a computer game for targeting a target object and attacking the targeted target object, the terminal (110 of FIG. 1) automatically targets target objects included in a designated range, and thus a user does not have to operate the terminal (110 of FIG. 1) to target a target object. As a result, user convenience and concentration on a computer game may be improved.

Furthermore, since the terminal (110 FIG. 1) automatically recognizes and targets a target object appearing at a long range, a user may play a computer game more easily. Furthermore, a user may play the computer game such that a target is not untargeted after the target object is targeted, and thus enjoyment regarding a computer game may be improved.

FIG. 11 is a flowchart of a method of targeting an object, according to an aspect of the presently disclosed embodiment.

Referring to FIG. 11, the method of targeting a target object includes operations that are chronologically performed by the terminal or the server 140 shown in FIG. 1. Therefore, even though omitted below, descriptions above of the terminal or the server 140 shown in FIG. 1 may also be applied to the method of targeting an object, as shown in FIG. 11.

In operation 1110, the terminal (110 of FIG. 1) combines a first character that can be controlled by a user with a second character based on first information input by the user. In detail, the terminal (110 of FIG. 1) receives the first information input by the user via a UI unit included in the terminal (110 of FIG. 1). Here, the first input information is information for the user to select a second character from among characters of the user and combine the selected second character with the first character.

A method of targeting an object, according to an aspect of the presently disclosed embodiment, is performed while first and second characters of a user are combined with each other. For example, if it is assumed that the first character is a hero character of an RPG game and the second character is an animal that the first character may mount, a method of targeting an object, according to an aspect of the presently disclosed embodiment, may correspond to a method of targeting a monster to attack while a hero character is mounted on an animal and is moving together with the animal. Here, the second character may be an animal moving on the ground or an animal moving in the sky.

In addition, the terminal (110 of FIG. 1) includes a UI unit which receives information input by a user. In detail, a UI unit is a module which obtains information input by a user and displays output information to the user. For example, a UI unit my include both input and output devices, such as a display panel, a mouse, a keyboard, a touch screen, a monitor, and a speaker, and software modules for driving the same.

Hereinafter, referring to FIG. 13, an operation for selecting a second character from among characters of a user, based on first information input by the user.

FIG. 13 is a diagram showing an operation for selecting a second character, according to an aspect of the presently disclosed embodiment.

The terminal (110 of FIG. 1) may store characters of a user in a database included in the terminal (110 of FIG. 1). FIG. 13 shows an example of a display screen of the terminal (110 of FIG. 1) on which a database storing characters of a user is displayed.

Referring to FIG. 13, a list 1310 of characters stored in a database may be displayed on the display screen of the terminal (110 of FIG. 1). When a user selects one of the characters stored in the database, brief information 1320 and a detailed specification 1330 regarding the selected character are displayed on the display screen of the terminal (110 of FIG. 1). Furthermore, information 1340 regarding the skills of the selected character may also be displayed on the display screen of the terminal (110 of FIG. 1).

A user may select one of the characters stored in a database of the terminal (110 of FIG. 1) and output the selected character as a second character, thereby combining a first character with the second character.

Hereinafter, an operation for combining a first character and a second character with each other based on first information input by a user with reference to FIGS. 14A-14C.

FIGS. 14A-14C are diagrams showing that a character and an object are combined with each other, according to an aspect of the presently disclosed embodiment.

Referring to FIG. 14(a), as shown on the right of FIG. 14(a), a character 1410 may be combined with a first object 1421. Here, the character 1410 may be combined with the first object 1421 as the character 1410 jumps on the back of the first object 1421, for example. However, the presently disclosed embodiment is not limited thereto, and the character 1410 may be combined with the first object 1421 in any of various manners as long as the character 1410 and the first object 1421 can be simultaneously controlled by a single command.

While the character 1410 is combined with the first object 1421, the character 1410 may be combined with a second object 1422 by jumping toward a second object 1422 and landing on the second object 1422. In addition, since objects include objects that can be converted to sub-characters and objects that cannot be converted to a sub-character, the first object 1421 and the second object 1422 to be combined with the character 1410 correspond only to objects that can be converted to a sub-character. If the first or second object 1421 or 1422 is an object that cannot be converted to a sub-character, the terminal (110 of FIG. 1) displays a message indicating that the character 1410 cannot be combined with the first or second object 1421 or 1422 on a display screen of the terminal (110 of FIG. 1) when the character 1410 jumps toward the first or second object 1421 or 1422. Accordingly, the terminal (110 of FIG. 1) may notify a user that the first or second object 1421 or 1422 is an object that cannot be converted to a sub-character.

Referring to FIG. 14B, the character 1410 may use a terrain feature, such as a cliff 1430, in the background of a computer game, to combine with an object 1423. For example, the character 1410 may be combined with the object 1423 by jumping toward the object 1423 from the cliff 1430 in the background of a computer game. Here, it may be set in advance that the character 1410 can be combined with the object 1423 only when height h of the cliff 1430 used by the character 1410 is equal to or above a designated height.

Referring to FIG. 14C, while the character 1410 is combined with a first object 1424, the character 1410 may be combined with a second object 1425 by jumping toward the second object 1425 and landing on the second object 1425. Here, the first object 1424 and the second object 1425 may be different objects. For example, the first object 1424 may be an animal moving on the ground, whereas the second object 1425 may be an animal moving in the sky (that is, a bird). When the character 1410 moves from the first object 1424, with which the character 1410 is currently combined, to another type of object, that is, the second object 1425, the terminal (110 of FIG. 1) may display on a display screen of the terminal (110 of FIG. 1) that the character 1410 performs a double jump.

Referring back to FIG. 11, in operation 1120, the terminal (110 of FIG. 1) sets a target range of a first character based on moving information regarding a second character. Here, the second character may be a character moving on the ground or in the sky. A method of targeting an object, according to an aspect of the presently disclosed embodiment, is set differently based on whether a second character is a character moving on the ground or in the sky. Detailed descriptions thereof will be given below.

First, an operation for setting a target range in a case where a second character is a character moving on the ground will be described with reference to FIG. 15.

FIG. 15 is a diagram showing an example of setting a target range in a case where a second character according to aspect of the presently disclosed embodiment is a character moving on the ground.

If a second character 1512 is a character moving on the ground, the terminal (110 of FIG. 1) sets a target range 1520 of a first character 1511 based on moving information regarding the second character 1512. Here, the moving information regarding the second character 1512 is moving direction and moving speed of the second character 1512. In other words, since the first character 1511 and the second character 1512 are combined with each other, the first character 1511 moves in correspondence to the moving direction and moving speed of the second character 1512.

The terminal (110 of FIG. 1) sets the target range 1520 based on a current moving direction and a current moving speed of the second character 1512. In other words, the terminal (110 of FIG. 1) sets the target range 1520 to move in correspondence to the current moving direction of the second character 1512. Furthermore, the terminal (110 of FIG. 1) sets an area the target range 1520 such that that area is changed in correspondence to the current moving speed of the second character 1512.

For example, it is assumed that the second character 1512 is moving northwest, the terminal (110 of FIG. 1) sets the target range 1520 to move northwest along the moving direction of the second character 1512. In other words, it may be set such that the target range 1520 moves based on the inertia of movement of the second character 1512.

Furthermore, if it is assumed that the second character 1512 is gradually accelerating, the terminal (110 of FIG. 1) sets the target range 1520 to be larger than the current target range 1520. Here, that the target range 1520 is larger may mean that a designated distance a from a location of the first character 1511 is longer than a current distance a. In addition, if it is assumed that the second character 1512 is gradually decelerating, the terminal (110 of FIG. 1) sets the target range 1520 to be smaller than the current target range 1520. Here, that the target range 1520 is smaller may mean that a designated distance a from a location of the first character 1511 is shorter than a current distance a.

In addition, the target range 1520 is set based on a designated distance a and a horizontal angle θ centering at a location of the first character 1511. Here, the designated distances a and the designated horizontal angle θ constituting the target range 520 may be pre-set with respect to types of equipment items set to the first character 1511.

For example, if an equipment item is a 'bow', the designated distance a may be set to 30 m and the horizontal angle may be set to 180° in advance. On the other hand, if an equipment item is a 'sword', the designated distance a may be set to 3 m and the horizontal angle may be set to 90° in advance. Therefore, every time a user changes an equipment item set to the first character 1511, the target range 1520 may be changed based on a pre-set designated distance a and a re-set horizontal angle θ.

In other words, the target range 1520 of the first character 1511 when the second character 1512 is not moving is determined based on a pre-set designated distance a and a horizontal angle θ corresponding to a type of an equipment item set to the first character 1511. If the second character 1512 moves, the target range 1520 is changed based on the target range 1520 when the second character 1512 is stopped.

Next, an operation for setting a target range in a case where a second character is a character moving in the sky will be described with reference to FIG. 16.

FIG. 16 is a diagram of an example of setting a target range in a case where a second character according to an aspect of the presently disclosed embodiment is a character moving in the sky.

If a second character 1612 is a character moving in the sky, the terminal (110 of FIG. 1) sets a target range 1620 of a first character 1622 based on moving information regarding the second character 1612. Here, the moving information regarding the second character 1612 is moving direction and moving speed of the second character 1612.

The terminal (110 of FIG. 1) sets the target range 1620 based on a current moving direction and a current moving speed of the second character 1612. In other words, the terminal (110 of FIG. 1) sets the target range 1620 to move in correspondence to the current moving direction of the second character 1612. Furthermore, the terminal (110 of FIG. 1) sets an area of the target range 1620 such that that area is changed in correspondence to the current moving speed of the second character 1612. Here, the method that the terminal (110 of FIG. 1) sets the target range 1620 based on a current moving direction and a current moving speed of the second character 1612 is the same as the method described above with reference to FIG. 15.

In addition, the target range 1620 of the first character 1622 is determined based on 3-dimensional (3D) directional axis around a location of the first character 1622. In other words, when a first character (1511 of FIG. 15) is combined with a second character (1512 of FIG. 15) moving on the ground, a target range (1520 of FIG. 15) is set as a 2-dimensional area. However, when a first character (1511 of FIG. 15) is combined with a second character (1512 of FIG. 15) in the sky, a target range (1520 of FIG. 15) is set as a 3-dimensional area.

Here, basic distances regarding respective 3D directions defining the target range 1620 may be set based on types of equipment items set to the first character 1611. In other words, the target range 1620 of the first character 1622 when the second character 1612 is not moving is determined based on basic distances regarding respective preset 3D directions based on types of equipment items set to the first character 1622. If the second character 1612 is moving, the target range 1620 is changed by using the method described above based on the target range 1620 when the second character 1612 is not moving.

Referring back to FIG. 11, in operation 1130, the terminal (110 of FIG. 1) determines whether an object designated based on second information input by a user is in a set target range. In detail, the terminal (110 of FIG. 1) designates an object based on the second input information input via a UI unit. Next, in operation 220, the terminal (110 of FIG. 1) determines whether the designated object is in a set target range. Hereinafter, referring to FIG. 8, a method for determining whether an object is in a set target range is described in detail.

Referring back to FIG. 8, the character 810 and target objects 831, 832, and 833 passing through the target range 820 are shown. Here, the target objects 831, 832, and 833 are not three different target objects. Instead, the target objects 831, 832, and 833 are a single target object 831, 832, and 833 that passes through the target range 820 according to lapse of time. Furthermore, the reference numeral 810 shows a shape formed as a first character and a second character are combined with each other.

In FIG. 8, the reference numerals 831 and 832 denote a case in which an objects are included in the target range 820, whereas a case in which the object moves out of the target range 820 is denoted by 833. The terminal (110 of FIG. 1) determines whether an object designated by a user is in the target range 820. In addition, if an object is at the location indicated by the reference numeral 833, the terminal (110 of FIG. 1) determines that the object is not in the target range 820.

Referring back to FIG. 11 in operation 1140, the terminal (110 of FIG. 1) displays an image indicating that an object is targeted based on a result of determination. In detail, based on a result of the determination in operation 1130, the terminal (110 of FIG. 1) displays an image indicating that an object is targeted at a location near shape of an object. Hereinafter, a method that the terminal (110 of FIG. 1) displays an image indicating that an object is targeted will be described in detail with reference to FIGS. 7A-7B.

Referring to FIG. 7A, if the target object 710 is not in a target range, no additional shape other than the shape of the target object 710 is displayed. However, referring to FIG. 7B, if the target object 710 is in a target range as the target object 710 or a character of a user moves, a shape 720 that is distinguishable from the shape of the target object 710 is displayed at a location near the target object 710. Therefore, the user may recognize that the target object 710 is in a target range and may attack the target object 710 by using an equipment item set to a character.

As described above, a target range is changed in real time based on moving information regarding a first character and a second character. Therefore, a user may target a target object to attack with improved reality, and thus concentration of the user on a computer game may be improved. Furthermore, since a target range is changed based on the type of a second character selected by a user or an equipment item set to a first character, playing a computer game may be more fun to a user.

FIG. 12 is a flowchart of a method of targeting an object, according to an aspect of the presently disclosed embodiment.

Referring to FIG. 12, the method of targeting a target object includes operations that are chronologically performed by the terminal or the server 140 shown in FIG. 1. Therefore, even though omitted below, descriptions above of the terminal or the server 140 shown in FIG. 1 and the method described above with reference to FIG. 11 may also be applied to the method of targeting a target object, as shown in FIG. 12.

In addition, operations 1210 and 1240 shown in FIG. 12 correspond to operations 1110 and 1140 described above with reference to FIG. 11, respectively. Therefore, detailed descriptions thereof will be omitted.

In operation 1250, when a targeted object is attacked based on third information input by a user, the terminal (110 of FIG. 1) determines success of the attack based on a designated probability. In detail, the terminal (110 of FIG. 1) attacks a targeted object based on information input by a user via a UI unit. Next, the terminal (110 of FIG. 1) determines a success of the attack regarding the object based on a designated probability.

For example, a user gives an order to attack an object (831 of FIG. 8) included in a target range (820 of FIG. 8), and the terminal (110 of FIG. 1) performs an attack on the object (831 of FIG. 8). Here, the attack may vary based on types of equipment items set to a first character. Here, the terminal (110 of FIG. 1) may determine whether the attack on the object (831 of FIG. 8) succeeded based on a designated probability.

For example, if it is assumed that the attack success probability of an equipment item set to a first character is 60%, the terminal (110 of FIG. 1) may determine whether an attack on the object (831 of FIG. 8) succeeded or not based on the success probability. Therefore, success of an attack on the object (831 of FIG. 8) may depend on types of equipment items set to a first character. Next, the terminal (110 of FIG. 1) displays information regarding whether the attack on the object (831 of FIG. 8) succeeded or not on the display screen of the terminal (110 of FIG. 1), thereby notifying a result of the attack on a user.

As described above, according to the one or more of the above aspects of the presently disclosed embodiment, in a computer game for targeting a target object and attacking the targeted target object, target objects included in a designated range are automatically targeted, and thus a user does not have to operate a terminal to target a target object. As a result, user convenience and concentration on a computer game may be improved.

Furthermore, since a target object appearing at a long range is automatically recognized and targeted, a user may play a computer game more easily. Furthermore, a user may play the computer game such that a target is not untargeted after the target object is targeted, and thus playing a computer game may be more fun.

Furthermore, a target range is changed in real time based on moving information regarding a first character and a second character. Therefore, a user may target a target object to attack with improved reality, and thus concentration of the user on a computer game may be improved. Furthermore, since a target range is changed based on the type of a second character selected by a user or an equipment item set to a first character, enjoyment of the user regarding a computer game may be improved.

In addition, other aspects of the presently disclosed embodiment can also be implemented through computer-readable code/instructions in/on a medium, e.g., a computer-readable recording medium, to control at least one processing element to implement any above-described aspects. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media.

It should be understood that the exemplary aspects described therein should be considered in a descriptive sense only and not for purposes of limitation. Descriptions of features or aspects within each disclosed embodiment should typically be considered as available for other similar features or aspects in other disclosed embodiments.

While one or more aspects of the presently disclosed embodiment have been described with reference to the figures, it will be understood by those of ordinary skill in the art that various changes in form and details may be made therein without departing from the spirit and scope of the presently disclosed embodiment as defined by the following claims.

What is claimed is:

1. A method of targeting at least one object in a computer game, the method comprising:
  combining a first character controlled by a user with a second character based on first information input by the user;
  setting a target range of the first character based on moving information regarding the second character, wherein the target range setting has a variable maximum range distance that varies based on both a change in velocity and a change in position of the second character;
  determining whether the object is within the set target range based on second input information from the user; and
  displaying an image indicating that an object is targeted based on a result of the determination.

2. The method of claim 1, wherein, in the setting of the target range, the target range is set based on a current moving direction and a moving speed of the second character, and
  the target range moves in correspondence to the current moving direction of the second character and area of the target range is changed in correspondence to the current moving speed of the second character.

3. The method of claim 1, wherein the target range comprises a range set based on 3-dimensional directional axis around a location of the first character.

4. The method of claim 1, further comprising, if an object is attacked based on third information input by the user, determining a success of the attack based on a designated probability.

5. A non-transitory computer-readable medium having recorded thereon a computer program for implementing the method of claim 1.

6. An apparatus for executing a computer game, the apparatus comprising:
  a combining unit, which combines a first character controlled by a user with a second character based on first information input by the user;
  a setting unit, which sets a target range of the first character based on moving information regarding the second character, wherein the target range setting has a variable maximum range distance that varies based on both a change in velocity and a change in position of the second character;
  a determining unit, which determines whether the object is within the set target range based on second input information from the user; and
  a display unit, which displays an image indicating that an object is targeted based on a result of the determination.

* * * * *

UNITED STATES PATENT AND TRADEMARK OFFICE
CERTIFICATE OF CORRECTION

PATENT NO. : 10,350,487 B2
APPLICATION NO. : 14/896986
DATED : July 16, 2019
INVENTOR(S) : Seok et al.

Page 1 of 1

It is certified that error appears in the above-identified patent and that said Letters Patent is hereby corrected as shown below:

On the Title Page

Item (71), Applicant: delete "WEMADE IO CO., LTD" and insert --WEMADE ICARUS CO., LTD-- therefor.

Item (73), Assignee: delete "WEMADE IO CO., LTD" and insert --WEMADE ICARUS CO., LTD-- therefor.

Signed and Sealed this
Twenty-first Day of April, 2020

Andrei Iancu
*Director of the United States Patent and Trademark Office*